United States Patent [19]

Lam

[11] Patent Number: 5,700,519
[45] Date of Patent: Dec. 23, 1997

[54] METHOD FOR PRODUCING ULTRA HIGH PURITY TITANIUM FILMS

[75] Inventor: Raymond K. F. Lam, Park Ridge, N.J.

[73] Assignees: Sony Corporation, Tokyo, Japan; Materials Research Corp., Gilbert, Ariz.

[21] Appl. No.: 369,389

[22] Filed: Jan. 6, 1995

[51] Int. Cl.$^6$ ............................................. C23C 16/08
[52] U.S. Cl. ........................... 427/253; 427/252; 427/250; 427/551; 427/124; 427/314; 202/154
[58] Field of Search .......................... 427/250, 253, 427/252, 551, 124, 314; 423/492; 75/10.11; 202/154

[56] References Cited

U.S. PATENT DOCUMENTS

| | | |
|---|---|---|
| 2,836,547 | 5/1958 | Stoddard et al. |
| 3,615,345 | 10/1971 | King .................. 75/10.11 |
| 4,619,695 | 10/1986 | Oikawa et al. .......... 75/10.65 |
| 4,793,854 | 12/1988 | Shimotori et al. |
| 5,108,490 | 4/1992 | Yoshimura . |
| 5,232,485 | 8/1993 | Yoshimura et al. ...... 75/10.28 |

FOREIGN PATENT DOCUMENTS

| | | |
|---|---|---|
| 4101128 | 8/1991 | Germany . |
| 62-292618 | 12/1987 | Japan . |
| 2252331 | 8/1992 | United Kingdom . |

OTHER PUBLICATIONS

V.D. Shah et al., "Preparation of Crystal Bar Titanium By The Iodide Process", Journal of the Less Common Metals, 53 (1977) pp. 109–116.

A. N. Zelikman, et al., "Metallurgy of Rare Metals", Israel Program for Scientific Translations, Jerusalem 1966.

F. B. Litton et al., "Composition, Structure & Properties of Iodide Titanium", Metal Progress; Mar., 1949, pp. 346–347.

I.E. Campbell et al., "The Preparation and Properties of Pure Titanium", Properties of Pure Titanium, vol. 93, No. 6, Jun., 1948, pp. 271–285.

Fujio, Imai, "Refined High–Purity Titanium and its Applications", Chitaniumu Jirukoniumu, 38(4), 185–8, 1990 (abstract only).

J. Bigot, "High–Purity Titaniium Production by the Van Arkel Process", 1975, pp. 151–155.

"Hydraulic and Mass–Transfer Characteristics of Industrial Rectification Columns for Purification of Titanium Tetrachloride", 1967, pp. 71–87 (English language abstract included).

S.A. Sidorenko et al., "Economic Methods for Purification of Titanium Tetrachloride", 1984, pp. 64–67 (English language abstract included).

Pierson, "Handbook of Chemical Vapor Deposition (CVD), Principles, Technology and Applications", Noyes Publications 1992, p. 87.

*Primary Examiner*—Roy V. King
*Attorney, Agent, or Firm*—Wood, Herron & Evans, L.L.P.

[57] ABSTRACT

A method is provided for depositing ultra high purity of greater than 99.998% titanium films which comprises generating gaseous $TiI_4$ in situ by reacting titanium metal starting material with gaseous iodide in a reaction chamber, purifying the $TiI_4$ by a double distillation process at reduced pressure to produce ultra high purity of greater than 99.998% $TiI_4$, transferring the ultra high purity $TiI_4$ in liquid form to a deposition chamber to vaporize the liquid $TiI_4$ and contacting a heated titanium substrate with the $TiI_4$ vapor, thereby depositing the ultra high purity Ti films on the substrate.

11 Claims, 2 Drawing Sheets

METHOD FOR PRODUCING ULTRA HIGH PURITY TITANIUM FILMS

1. Field of the Invention

The invention relates to the production of titanium tetraiodide and titanium metal, and more particularly, to systems and methods for producing ultra high purity titanium tetraiodide and ultra high purity titanium metal.

2. Background of the Invention

In the semiconductor industry, significant advances have been made in producing lighter, thinner, and smaller integrated circuits and semiconductor devices that have complex wiring networks patterned on their surfaces. As wiring networks are made smaller and more dense, parameters such as barrier performance and contact resistance become very critical to reducing signal delay, and to avoid melting of wiring materials due to resistance since higher operating temperatures are being employed.

In light of the foregoing, there has developed a significant demand for semiconductor wiring material that has a relatively high melting point and low resistance values. One material identified as possessing suitable properties is titanium metal. It is critical to the performance of semiconductor devices, particularly the thinner and smaller integrated circuits, that the purity of the titanium metal be as high as possible. This requires removal of the undesirable impurities typically found in titanium, which includes heavy metals, alkalis, uranium, thorium, tin, magnesium, carbon, nitrogen, and oxygen. The heavy metals, including iron, cobalt, nickel, and chromium, can cause crystal lattice defects in the silicon substrate. Whereas the presence of alkali of sodium and potassium brings about capacitance-voltage (CV) shifts. Furthermore, soft errors in MOS memory can be caused by alpha particles emitted from radioactive elements such as uranium and thorium, which are known titanium impurities. Additionally, tin and magnesium can cause grain, etch, corrosion, and electromigration problems in the resulting semiconductor devices produced and thus the elimination or minimization of the impurity levels of those materials is desirable. Finally, interstitial impurities of carbon, nitrogen, and oxygen can initiate electromigration, which may result in premature failure of integrated circuits.

In accord with the defined need for ultra pure titanium metal, there is a corresponding need for ultra high purity titanium tetraiodide, which can be used as the precursor in titanium metal production, such as by decomposition of titanium tetraiodide and deposition of titanium metal. In addition, titanium tetraiodide may be used in the production of semiconductor devices for chemical vapor deposition of titanium and titanium nitrite thin films. Known methodologies for titanium metal purification include the Van Arkel and deBoer iodide process described in I. E. Campbell et al., "The Preparation and Properties of Pure Titanium", *Journal of Electrochemical Society*, Vol. 93, No. 6, pp. 271–285 (June, 1948). Other methods include direct reduction by active metals such as magnesium and sodium, electrolytic refining using fused salt as the electrolyte, and electron beam melting. Each of these methodologies has limitations or disadvantages; for example, in the direct reduction method the impurities present in the reactant magnesium or sodium may contaminate the titanium since magnesium and sodium of greater than 99.99% purity are not commercially available. Electrolytic refining appears to be limited in commercial operations to producing titanium with a maximum purity of 99.995%. Finally, electron beam melting has a limited purification capability because only the high volatility impurities are removed.

In response to the industry needs for ultra high purity titanium metal and titanium tetraiodide, the systems and methods of the present invention, as disclosed hereinbelow, provide a means by which such ultra high purity products are produced.

SUMMARY OF THE INVENTION

In its broadest aspects, the present invention is directed to a method of making an ultra high purity metal halide wherein the halide is selected from the group consisting of bromides, chlorides, iodides and fluorides.

In a specific embodiment, the invention is directed to a method of making ultra high purity titanium tetraiodide wherein gaseous titanium tetraiodide is generated in situ by reacting titanium metal with gaseous iodine in a reaction chamber under vacuum conditions. The gaseous titanium tetraiodide is then transferred to a first distillation column to remove lower volatility impurities. The first distillation column is operated at a temperature in the range of about 150°–370° C. and at a pressure below atmospheric pressure to produce partially pure titanium tetraiodide, which is then transferred to a second distillation column. The partially pure titanium tetraiodide is distilled in the second distillation column to remove higher volatility impurities; the second distillation column is operated at a temperature in the range of about 150°–370° C. and at a pressure below atmospheric to produce high ultra purity titanium tetraiodide. Utilizing the method of the present invention, it is believed that ultra high purity titanium tetraiodide having a purity greater than 99.998% and as high as 99.9991% can be produced.

Another aspect of the invention is directed to a method of making ultra high purity titanium metal. The foregoing steps described for producing ultra high purity titanium tetraiodide are followed and the ultra high purity $TiI_4$ is used as a precursor material which is transferred in liquid form to a deposition chamber heated to a temperature sufficient to vaporize the liquid, ultra pure titanium tetraiodide. The $TiI_4$ is decomposed within the deposition chamber by contacting it with a titanium deposition substrate located within the deposition chamber and heated to a temperature in the range of about 1100°–1400° C. Contact with the hot deposition substrate by the titanium tetraiodide vapor decomposes that vapor and ultra high purity titanium metal is deposited on the substrate. The titanium substrate may be a high purity titanium filament, rod, or open or closed end tube. It will be appreciated that other titanium substrate configurations can also be used to receive the titanium deposition. The purity of the deposited titanium metal can be further enhanced by subjecting it to post-deposition electron beam melting. Utilizing the method of the present invention, it is believed that ultra high purity titanium metal having a purity greater than 99.998% and as high as 99.999% can be produced.

Yet another aspect of the invention is a system for producing ultra high purity titanium metal. The system of the invention includes a titanium tetraiodide generating subsystem; a titanium tetraiodide purification subsystem wherein titanium tetraiodide is refined to ultra high purity; and a titanium tetraiodide decomposition subsystem wherein titanium tetraiodide is decomposed and ultra high purity titanium metal is deposited on a deposition substrate. Furthermore, the system may include a dynamic gas flow subsystem associated with the titanium tetraiodide decomposition subsystem.

The titanium tetraiodide generating subsystem includes a reaction chamber operated under vacuum conditions wherein titanium metal and gaseous iodine are reacted at a steady state temperature in the range of about 500°–750° C. to generate gaseous titanium tetraiodide in situ. The subsystem further includes a titanium tetraiodide product chamber wherein the titanium tetraiodide is collected and maintained separate from the titanium metal starting material. The titanium metal starting material may typically have a purity on the order of about 99.9%.

The titanium tetraiodide purification subsystem includes a first distillation column for removing lower volatility impurities from the titanium tetraiodide produced in the generating subsystem. The first distillation column is operated at a temperature in the range of about 150°–370° C. and at a pressure below atmospheric, typically in the range of about 0.05–670 torr, to produce partially pure titanium tetraiodide. The purification subsystem further includes a second distillation column to remove higher volatility impurities. This second distillation column is operated preferably at a temperature in the range of about 150°–370° C. and at a pressure below atmospheric, also typically in the range of about 0.05–670 torr, to produce ultra high purity titanium tetraiodide.

The titanium tetraiodide decomposition subsystem includes a deposition chamber which is in communication with the titanium tetraiodide purification subsystem. In the decomposition chamber, the ultra high purity titanium tetraiodide is vaporized by heating it above its vaporization temperature, in the range of 100°–300° C., and is then decomposed and ultra high purity titanium metal is deposited on a titanium substrate housed within the chamber. The substrate is heated to a temperature in the range of about 1100°–1400° C. Preferably, a dynamic gas flow subsystem is associated with the decomposition subsystem. The dynamic gas flow subsystem includes a vacuum pump having automatic pressure control for pumping the titanium tetraiodide through the decomposition chamber to promote the continuous formation and deposition of titanium metal and to remove unreacted titanium tetraiodide and gaseous by-products from the deposition chamber. The dynamic gas flow subsystem may further include a cold trap for capturing the gaseous by-products and unreacted titanium tetraiodide.

It will be appreciated by persons skilled in the art that various modifications and changes to the methods and systems of the present invention can be made without departing from the scope of the invention. Additional features and advantages of the present invention will become apparent upon review of the following detailed description taken in conjunction with the figures.

DETAILED DESCRIPTION OF THE INVENTION

The details of the present invention, including examples and experimental data, will now be described with appropriate reference to the Figures. In one aspect, the invention is directed to a method of producing ultra high purity titanium metal. In another aspect, the invention encompasses a method of making ultra high purity titanium tetraiodide, which may be the precursor used in the production of ultra high purity titanium metal, or it may be used for other purposes.

Figure 1:
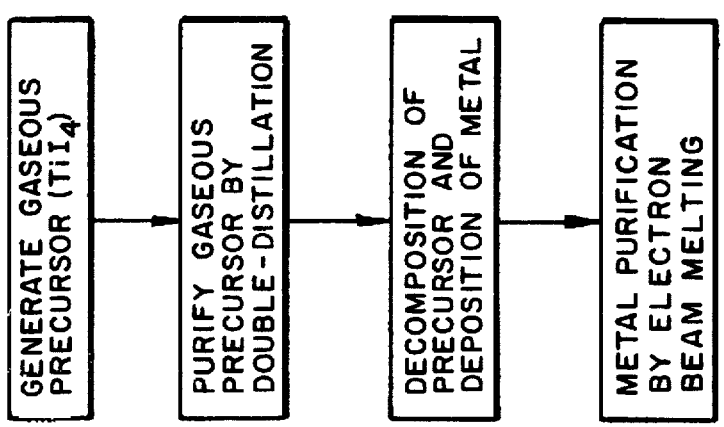
FIG. 1 is a flow diagram representing a preferred method of making ultra high purity titanium metal in accordance with the present invention.

FIG. 1 shows in a flow diagram the preferred steps for producing ultra high purity titanium metal in accordance with the invention. The terminology "ultra high purity" as used herein is intended to encompass titanium metal having a purity on the order of 99.998% to 99.999% (the latter also known as 5N purity). Utilizing the method and system of the present invention, such high purity can be achieved utilizing as the starting material titanium metal in the form of a sponge, having a purity of only 99.9%. It is an aim of the invention to produce ultra high purity titanium metal wherein the major impurities are limited so as not to exceed the following levels:

Fe 12 ppm
Si 2 ppm
Sn 4 ppm
Sb 0.2–1.2 ppm
As 0.2–0.8 ppm.

By meeting the above-targeted purity levels, the ultra high purity titanium metal produced in accordance with the present invention is advantageously useful in a wide variety of semiconductor applications.

As stated, the generation of ultra high purity titanium tetraiodide is also encompassed by the present invention. The phrase "ultra high purity" titanium tetraiodide as used herein is intended to encompass titanium tetraiodide having a purity on the order of 99.998% to 99.9991%. The acceptable impurity levels in the ultra high purity titanium tetraiodide are as follows:

Al 0.3–0.6 ppm
Si 2.0–4.0 ppm
Fe 0.5–1.0 ppm
Sn 0.5–2.0 ppm
Mo 0.2–1.0 ppm.

In a preferred embodiment, the method of producing ultra high purity titanium tetraiodide has as an initial step the generation of gaseous titanium tetraiodide in situ by reacting titanium metal with gaseous iodine in a reaction chamber under vacuum conditions. Preferably the reaction will be carried out at a steady state temperature in the range of about 500°–750° C., and more preferably at a temperature of approximately 630°–650° C. The pressure in the reaction chamber is maintained below atmospheric, and is preferably in the range of about 0.05–670 torr, and more preferably in the range of about 0.05–0.1 torr. The titanium metal starting material used typically has a purity on the order of about 99.9% and may be in the form of a metal sponge, such as is commonly available from The Oregon Metallurgical Corp. The high temperature TiI$_4$ generating step tends to reduce the levels of arsenic and antimony impurities in the final product.

The gaseous reaction product TiI$_4$ is then transferred to a first distillation column to remove the lower volatility impurities, including aluminum and iron. This is accomplished by operating the first distillation column at a temperature in the range of about 150°–370° C. and a pressure in the range of about 0.05–670 torr. More preferably, the first distillation column is maintained at a temperature of approximately 220° C. and at a pressure in the range of about 2.5–4 torr during the first distillation step. The result of the first distillation is a partially pure titanium tetraiodide gas which is then transferred to a second distillation column to remove higher volatility impurities, including tin and silicon. The second column is preferably operated at a temperature in the range of about 150°–370° C. and at a pressure in the range of about 0.05–670 torr to produce ultra high purity TiI$_4$. More preferably, the second distillation column is operated at a temperature of approximately 195° C. and at a pressure in the range of about 2.5–4 torr. Utilizing this methodology, ultra high purity TiI$_4$ having a purity greater than 99.998% and as high as 99.9991% can be produced.

The present invention also encompasses the production of ultra high purity titanium metal. In the preferred methodology, the steps recited above with respect to producing ultra high purity TiI$_4$ are followed and the ultra high purity titanium tetraiodide product is utilized as a precursor which is transferred in liquid form to a deposition chamber that is heated to a temperature of about 200° C. so as to vaporize the liquid TiI$_4$. The ultra high purity TiI$_4$ vapor is then contacted with a titanium deposition substrate located within the deposition chamber and heated to a temperature in the range of about 1100°–1400° C. The contact with the high temperature deposition substrate decomposes the TiI$_4$ and ultra high purity titanium metal is deposited on the substrate. Preferably, the temperature of the titanium deposition substrate is in the range of 1300°–1400° C. and the deposition chamber is maintained at a pressure in the range of 0.05–0.1 torr during the decomposition and deposition steps. The resulting titanium metal can be further purified by electron beam melting to remove additional volatile impurities such as aluminum, chromium, manganese, and copper, although this is an optional step. The resulting titanium metal is expected to have a purity greater than 99.998% and as high as 99.999%.

Figure 2:
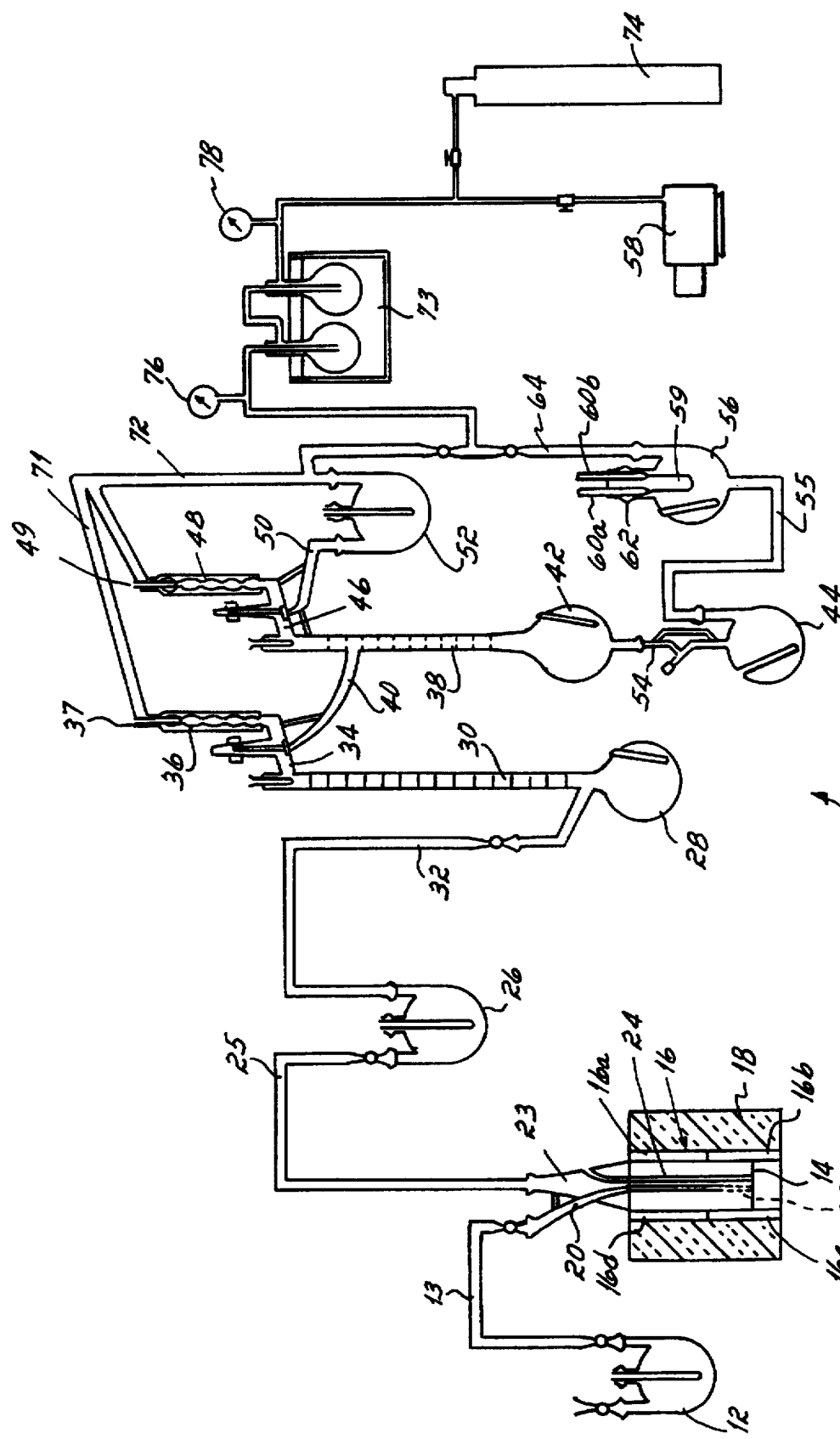
FIG. 2 is a schematic representation of a titanium metal production system in accordance with the invention.

With reference to the figures, the apparatus and systems according to the invention will now be described. In particular, FIG. 2 is a schematic representation of a titanium metal production system 10 in accordance with the invention. The specific system shown consists of bench-scale apparatus in the form of laboratory equipment. However, for production purposes certain modifications will be required, although it is believed that the processing parameters (including pressure and temperature) in a production-scale unit would be substantially the same as in the bench-scale system.

In use, high purity iodine (on the order of 99.99993% purity) is charged to iodine flask 12 and a low-grade (99.9% purity) titanium sponge is charged to titanium flask 14. Iodine flask 12 and titanium flask 14 are connected by means of connection tube 13. Titanium flask 14 is utilized as the reaction chamber and is heated by means of a 2-zone, high temperature furnace 16 surrounded by insulation 18. The quartz reactor 14 includes gas inlet tubing 20 which extends to the bottom of the reactor and has gas inlet pores 22 which facilitate complete solid-gas reaction. A thermocouple well in the form of a tube 24 also is centrally located in reactor 14. The 2-zone, high temperature furnace 16 is made up of four half-cylindrical sections 16a, 16b, 16c and 16d, respectively, and is surrounded by 3¼ of insulation 18. Preferably, both the gas inlet tube and thermocouple well are welded to the bottom of titanium flask/quartz reactor 14. Additionally, quartz reactor 14 includes a gas outlet 23 through which the generated titanium tetraiodide is released.

The gaseous titanium tetraiodide passes through connection tube 25 to titanium tetraiodide flask 26. The titanium tetraiodide in flask 26 is then delivered to reboiler 28 which is located at the base of first distillation column 30. The titanium tetraiodide is transferred via connection tube 32. First distillation column 30, which is preferably an Oldershaw column, is used to remove relatively lower volatility impurities from the titanium tetraiodide. The partially pure titanium tetraiodide is transferred via an overhead connection tube 34 to a first reflux condenser 36, which has an exhaust outlet 37. The partially pure TiI$_4$ is then transferred in a liquid state to second distillation column 38 by means of connection tube 40. Second column 38 is preferably a Vigreux column. Distillation in second distillation column 38 is intended to remove relatively higher volatility impurities from the TiI$_4$. The purified TiI$_4$ liquid is drained from reboiler 42 of second column 38 into receiving flask 44. The overhead vapors from second distillation column 38 are transferred via connection tube 46 to a second reflux condenser 48, which also has an exhaust outlet 49. The condensed liquid from the second reflux condenser 48 is transferred via connection tube 50 to final flask 52, which serves to trap the higher volatility impurities from second distillation column 38. The purified liquid TiI$_4$ is drained from second reboiler 42 and is transferred via connection tube 54 to receiving flask 44.

A dynamic flow system is induced in receiving flask 44 and deposition flask 56 by a mechanical pump 58, during the titanium deposition step to be described below. Flasks 44 and 56 are connected by tube 55. Connecting tubes 71 and 72 provide a pathway by which the appropriate reduced pressure levels are maintained in iodine flask 12, titanium flask 14, TiI$_4$ flask 26, first and second distillation columns 30 and 38, and final flask 52. A cold trap system 73 is employed to capture the gaseous by-products and unreacted TiI$_4$ and also serves to protect mechanical pump 58 from the corrosive iodine and iodide gases. The system of the invention also includes a source of argon gas (cylinder) 74 to provide an inert reducing gas atmosphere to the entire apparatus.

The decomposition of the TiI$_4$ takes place in the titanium deposition flask 56 by heating the titanium filament 59 to a temperature in the range of 1100°–1400° C. such that upon contact with the gaseous TiI$_4$, decomposition occurs and deposition of titanium metal occurs on filament 59. Deposition flask 56 is fitted with two molybdenum or tungsten electrodes 60a and 60b which are sealed directly on a top O-ring cap 62 of flask 56. A titantium filament having a purity of 99.99%, a diameter of 0.02–0.03", and 4" in length is clamped to the four strands of the electrodes 60a and b by Mo wires (not explicitly shown). The temperature throughout the system is maintained by 31 Eurotherm temperature controllers. The system shown in FIG. 2 also includes approximately 64 temperature measuring Type K thermocouples, and the pressure is monitored by means of vacuum gauges 76 and 78. A computerized data acquisition and control system is utilized to control the system temperature and pressure conditions to the desired parameters.

In use, the system as shown in FIG. 2 has iodine charged to the iodine flask 12, and crude titanium metal in the form of a sponge charged to the titanium flask 14. The system is evacuated to less than 100 millitorr and TiI$_4$ is generated by releasing the iodine gas from the iodine flask 12 to the titanium flask 14 by means of connecting tube 13. The iodine is preferably heated to approximately 140°–155° C. and the titanium sponge is maintained at approximately 630° C. The gaseous TiI$_4$ exits the reaction chamber 14 via gas outlet 23 and through connecting tubing 25 to titanium tetraiodide flask 26 which is maintained at a temperature below the boiling point of TiI$_4$. The overall system is constantly evacuated by mechanical pump 58. Generally, the rate of generation of TiI$_4$ is governed by the temperature in the iodine flask.

At the completion of the iodine transfer, any TiI$_4$ remaining in the titanium flask 14 is transferred to the titanium tetraiodide flask by heating the TiI$_4$ to at least 210° C. at a chamber pressure of approximately 5 torr. The TiI$_4$ flask is maintained at approximately 160° C. internal temperature so as to capture liquid TiI$_4$. After the collection of TiI$_4$ in flask 26, the TiI$_4$ is then delivered to the bottom of first distillation column 30 by heating the TiI$_4$ to about 210° C. and maintaining the bottom of the first column at approximately 160° C.

The first distillation step is conducted after the titanium iodide flask 26 is isolated from the first column 30 by means of suitable valving. The second distillation in column 38 is conducted after approximately one-half of the TiI$_4$ is distilled from the first column to the second column. The purified TiI$_4$ liquid is then drained from the reboiler 42 of the second column 38 and transferred to receiving flask 44. High volatility impurities are captured overhead in final flask 52. The purity of the TiI$_4$ at this point is approximately 99.999% pure. The receiving flask is then shut off from the distillation system by a valve, and mechanical pump 58 draws the TiI$_4$ into deposition flask 56 via line 55 wherein the titanium filament is heated to approximately 1300° C. and decomposition of the TiI$_4$ and deposition of titanium metal on the filament occur. Gaseous by-products and unreacted TiI$_4$ are exhausted from deposition flask 56 via line 64 and are captured in cold trap 73.

The following Tables 1–6 summarize the preferable temperature and pressure operating conditions through the system depicted in FIG. 2. More particularly, Table 1 summarize the operating conditions of the apparatus elements during the high temperature generation of TiI$_4$. Table 2 summarizes the conditions during the transfer of TiI$_4$ from the TiI$_4$ flask to the first distillation column reboiler. Table 3 summarizes the conditions during the first distillation step. Table 4 summarizes the conditions during the second distillation step. Table 5 summarizes the conditions during the transfer of TiI$_4$ from the reboiler of the second distillation column to the receiving flask. Table 6 summarizes the conditions during the decomposition of the TiI$_4$.

TABLE 1

| System Component (Ref. No.) | Temperature (C.) | Pressure (Torr) |
| --- | --- | --- |
| Iodine flask (12) | 140 | |
| Connection tube (13) | 170 | |
| Ti flask (14) | 630 | 0.05–0.1 |
| Connection tube (25) | 175 | 0.05–0.1 |
| TiI$_4$ flask (26) | 25 | 0.05–0.1 |
| Connection tube (32) | 165 | 0.05–0.1 |
| First reboiler (28) | 25 | 0.05–0.1 |
| First distillation column (lower) (30) | 160 | 0.05–0.1 |
| First distillation column (upper) (30) | 160 | 0.05–0.1 |
| Connection tube (34) | 160 | 0.05–0.1 |
| Reflux condenser (36) | 160 | 0.05–0.1 |
| Top exhaust of condenser (37) | 165 | 0.05–0.1 |
| Connection tube (40) | 160 | 0.05–0.1 |
| Second reboiler (42) | 25 | 0.05–0.1 |
| Second distillation column (lower) (38) | 160 | 0.05–0.1 |
| Second distillation column (upper) (38) | 160 | 0.05–0.1 |
| Connection tube (46) | 160 | 0.05–0.1 |
| Reflux condenser (48) | 160 | 0.05–0.1 |
| Top exhaust of condenser (49) | 160 | 0.05–0.1 |
| Connection tube (50) | 160 | 0.05–0.1 |
| Final flask (52) | 25 | 0.05–0.1 |
| Exhaust of final flask (72) | 160 | 0.05–0.1 |
| Connection tube (54) | 25 | 0.05–0.1 |
| Receiving flask (44) | 25 | 0.05–0.1 |
| Connection tube (55) | 25 | 0.05–0.1 |
| Deposition flask (56) | 25 | 0.05–0.1 |
| Top cap of deposition flask (62) | 25 | 0.05–0.1 |
| Exhaust of deposition flask (64) | 165 | 0.05–0.1 |

TABLE 2

| System Component (Ref. No.) | Temperature (C.) | Pressure (Torr) |
| --- | --- | --- |
| Iodine flask (12) | 25 | 2.5–4 |
| Connection tube (13) | 165 | 2.5–4 |
| Ti flask (14) | 175 | 2.5–4 |
| Connection tube (25) | 170 | 2.5–4 |
| TiI$_4$ flask (26) | 230 | 2.5–4 |
| Connection tube (32) | 175 | 2.5–4 |
| First reboiler (28) | 180 | 2.5–4 |
| First distillation column (lower) (30) | 165 | 2.5–4 |
| First distillation column (upper) (30) | 160 | 2.5–4 |
| Connection tube (34) | 160 | 2.5–4 |
| Reflux condenser (36) | 160 | 2.5–4 |
| Top exhaust of condenser (37) | 165 | 2.5–4 |
| Connection tube (40) | 160 | 2.5–4 |
| Second reboiler (42) | 25 | 2.5–4 |
| Second distillation column (lower) (38) | 160 | 2.5–4 |
| Second distillation column (upper) (38) | 160 | 2.5–4 |
| Connection tube (46) | 160 | 2.5–4 |
| Reflux condenser (48) | 160 | 2.5–4 |
| Top exhaust of condenser (49) | 160 | 2.5–4 |
| Connection tube (50) | 160 | 2.5–4 |
| Final flask (52) | 25 | 2.5–4 |
| Exhaust of final flask (72) | 160 | 2.5–4 |
| Connection tube (54) | 25 | 2.5–4 |
| Receiving flask (44) | 25 | 2.5–4 |
| Connection tube (55) | 25 | 2.5–4 |
| Deposition flask (56) | 25 | 2.5–4 |
| Top cap of deposition flask (62) | 25 | 2.5–4 |
| Exhaust of deposition flask (64) | 160 | 2.5–4 |

TABLE 3

| System Component (Ref. No.) | Temperature (C.) | Pressure (Torr) |
| --- | --- | --- |
| Iodine flask (12) | 25 | 2.5–4 |
| Connection tube (13) | 25 | 2.5–4 |
| Ti flask (14) | 25 | 2.5–4 |
| Connection tube (25) | 25 | 2.5–4 |
| TiI$_4$ flask (26) | 25 | 2.5–4 |
| Connection tube (32) | 175 | 2.5–4 |
| First reboiler (28) | 270 | 2.5–4 |
| First distillation column (lower) (30) | 220 | 2.5–4 |
| First distillation column (upper) (30) | 220 | 2.5–4 |
| Connection tube (34) | 160 | 2.5–4 |
| Reflux condenser (36) | 165 | 2.5–4 |
| Top exhaust of condenser (37) | 165 | 2.5–4 |
| Connection tube (40) | 175 | 2.5–4 |
| Second reboiler (42) | 185 | 2.5–4 |
| Second distillation column (lower) (38) | 175 | 2.5–4 |
| Second distillation column (upper) (38) | 175 | 2.5–4 |
| Connection tube (46) | 160 | 2.5–4 |
| Reflux condenser (48) | 160 | 2.5–4 |
| Top exhaust of condenser (49) | 165 | 2.5–4 |
| Connection tube (50) | 160 | 2.5–4 |
| Final flask (52) | 120 | 2.5–4 |
| Exhaust of final flask (72) | 160 | 2.5–4 |
| Connection tube (54) | 50 | 2.5–4 |
| Receiving flask (44) | 25 | 2.5–4 |
| Connection tube (55) | 25 | 2.5–4 |
| Deposition flask (56) | 25 | 2.5–4 |
| Top cap of deposition flask (62) | 25 | 2.5–4 |
| Exhaust of deposition flask (64) | 160 | 2.5–4 |

TABLE 4

| System Component (Ref. No.) | Temperature (C.) | Pressure (Torr) |
| --- | --- | --- |
| Iodine flask (12) | 25 | 2.5–4 |
| Connection tube (13) | 25 | 2.5–4 |

TABLE 4-continued

| System Component (Ref. No.) | Temperature (C.) | Pressure (Torr) |
|---|---|---|
| Ti flask (14) | 25 | 2.5-4 |
| Connection tube (25) | 25 | 2.5-4 |
| TiI$_4$ flask (26) | 25 | 2.5-4 |
| Connection tube (32) | 165 | 2.5-4 |
| First reboiler (28) | 160 | 2.5-4 |
| First distillation column (lower) (30) | 175 | 2.5-4 |
| First distillation column (upper) (30) | 175 | 2.5-4 |
| Connection tube (34) | 160 | 2.5-4 |
| Reflux condenser (36) | 160 | 2.5-4 |
| Top exhaust of condenser (37) | 175 | 2.5-4 |
| Connection tube (40) | 175 | 2.5-4 |
| Second reboiler (42) | 225 | 2.5-4 |
| Second distillation column (lower) (38) | 195 | 2.5-4 |
| Second distillation column (upper) (38) | 195 | 2.5-4 |
| Connection tube (46) | 165 | 2.5-4 |
| Reflux condenser (48) | 165 | 2.5-4 |
| Top exhaust of condenser (49) | 175 | 2.5-4 |
| Connection tube (50) | 170 | 2.5-4 |
| Final flask (52) | 180 | 2.5-4 |
| Exhaust of final flask (72) | 165 | 2.5-4 |
| Connection tube (54) | 120 | 2.5-4 |
| Receiving flask (44) | 25 | 2.5-4 |
| Connection tube (55) | 25 | 2.5-4 |
| Deposition flask (56) | 25 | 2.5-4 |
| Top cap of deposition flask (62) | 25 | 2.5-4 |
| Exhaust of deposition flask (64) | 165 | 2.5-4 |

TABLE 5

| System Component (Ref. No.) | Temperature (C.) | Pressure (Torr) |
|---|---|---|
| Iodine flask (12) | 25 | 200-400 |
| Connection tube (13) | 25 | 200-400 |
| Ti flask (14) | 25 | 200-400 |
| Connection tube (25) | 25 | 200-400 |
| TiI$_4$ flask (26) | 25 | 200-400 |
| Connection tube (32) | 165 | 200-400 |
| First reboiler (28) | 160 | 200-400 |
| First distillation column (lower) (30) | 175 | 200-400 |
| First distillation column (upper) (30) | 175 | 200-400 |
| Connection tube (34) | 160 | 200-400 |
| Reflux condenser (36) | 160 | 200-400 |
| Top exhaust of condenser (37) | 175 | 200-400 |
| Connection tube (40) | 175 | 200-400 |
| Second reboiler (42) | 195 | 200-400 |
| Second distillation column (lower) (38) | 195 | 200-400 |
| Second distillation column (upper) (38) | 195 | 200-400 |
| Connection tube (46) | 165 | 200-400 |
| Reflux condenser (48) | 165 | 200-400 |
| Top exhaust of condenser (49) | 175 | 200-400 |
| Connection tube (50) | 170 | 200-400 |
| Final flask (52) | 185 | 200-400 |
| Exhaust of final flask (72) | 165 | 200-400 |
| Connection tube (54) | 170 | 200-400 |
| Receiving flask (44) | 185 | 200-400 |
| Connection tube (55) | 25 | 200-400 |
| Deposition flask (56) | 25 | 200-400 |
| Top cap of deposition flask (62) | 25 | 200-400 |
| Exhaust of deposition flask (64) | 165 | 200-400 |

TABLE 6

| System Component (Ref. No.) | Temperature (C.) | Pressure (Torr) |
|---|---|---|
| Iodine flask (12) | 25 | 0.05-0.1 |
| Connection tube (13) | 25 | 0.05-0.1 |
| Ti flask (14) | 25 | 0.05-0.1 |
| Connection tube (25) | 25 | 0.05-0.1 |
| TiI$_4$ flask (26) | 25 | 0.05-0.1 |
| Connection tube (32) | 25 | 0.05-0.1 |
| First reboiler (28) | 25 | 0.05-0.1 |
| First distillation column (lower) (30) | 25 | 0.05-0.1 |
| First distillation column (upper) (30) | 25 | 0.05-0.1 |
| Connection tube (34) | 25 | 0.05-0.1 |
| Reflux condenser (36) | 25 | 0.05-0.1 |
| Top exhaust of condenser (37) | 25 | 0.05-0.1 |
| Connection tube (40) | 25 | 0.05-0.1 |
| Second reboiler (42) | 25 | 0.05-0.1 |
| Second distillation column (lower) (38) | 25 | 0.05-0.1 |
| Second distillation column (upper) (38) | 25 | 0.05-0.1 |
| Connection tube (46) | 25 | 0.05-0.1 |
| Reflux condenser (48) | 25 | 0.05-0.1 |
| Top exhaust of condenser (49) | 175 | 0.05-0.1 |
| Connection tube (50) | 25 | 0.05-0.1 |
| Final flask (52) | 25 | 0.05-0.1 |
| Exhaust of final flask (72) | 165 | 0.05-0.1 |
| Connection tube (54) | 170 | 0.05-0.1 |
| Receiving flask (44) | 185 | 0.05-0.1 |
| Connection tube (55) | 185 | 0.05-0.1 |
| Deposition flask (56) | 190 | 0.05-0.1 |
| Ti filament substrate (59) | 1300-1400 | 0.05-0.1 |
| Top cap of deposition flask (62) | 70 | 0.05-0.1 |
| Exhaust of deposition flask (64) | 170 | 0.05-0.1 |

Figure 3:
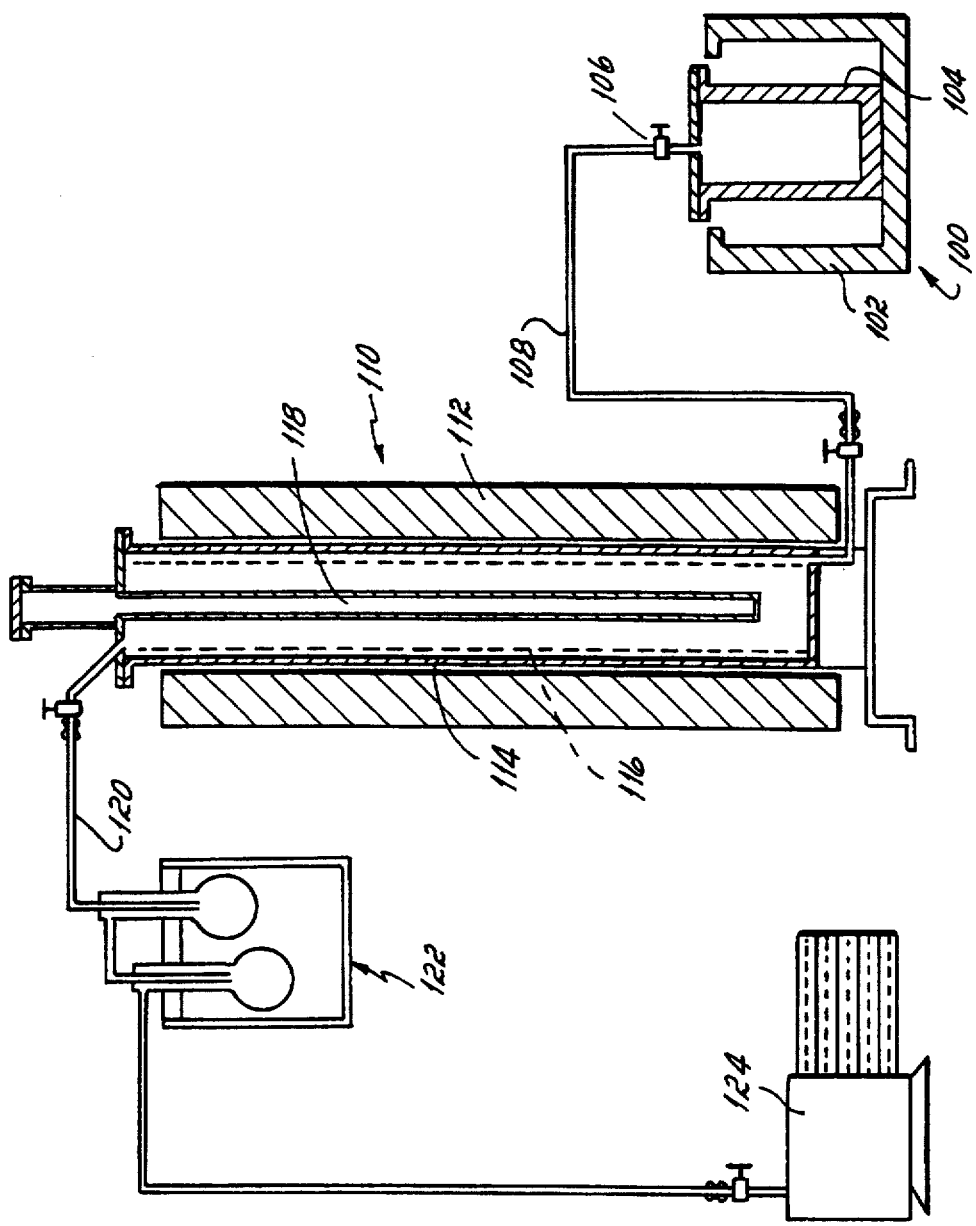
FIG. 3 is a schematic representation, in partial cross-section, of a dynamic titanium tetraiodide generating unit and titanium metal deposition unit.

Whereas FIG. 2 depicts a bench-scale system according to the invention, FIG. 3 depicts a dynamic large bench reactor with a deposition finger and a TiI$_4$ generation unit which may be suitable for commercial production. The dynamic system includes a TiI$_4$ generation unit 100 which consists of a furnace 102 surrounding a titanium chamber 104. After generation of the TiI$_4$ within the titanium chamber by reaction of crude titanium sponge with iodine gas, the valve 106 is opened to release the TiI$_4$ which passes through titanium tubing 108 to the titanium deposition unit 110, which consists of a furnace 112, a titanium reaction chamber 114, a molybdenum screen 116 and a suspended titanium finger 118, which may be in the form of a hollowed tube or may be open at one or both ends. The deposition finger 118 is heated by a rod-type silicon carbide heater (not specifically shown). After decomposition of the TiI$_4$, iodine gas and residual iodide gases exit the titanium deposition unit 110 via valve tubing 120 to a double cold trap 122 which capture the residual gases in a solid form. The dynamic iodide gas flow is induced in the system continuously by mechanical pump 124 during the generation and deposition steps.

While the systems and methods of the present invention have been described with reference to preferred embodiments and specific examples, the present invention is not to be limited to such specifics and is intended to encompass various modifications and changes which will become readily apparent to persons skilled in the art. The scope of the invention is defined solely by the appended claims.

What is claimed is:

1. A method of making ultra high purity titanium metal, comprising the steps of:

generating gaseous TiI$_4$ in situ by reacting titanium metal starting material with gaseous iodine in a reaction chamber under vacuum conditions, said reaction occurring at a steady state temperature in the range of about 500°-750° C.;

transferring the gaseous reaction product TiI$_4$ to a first distillation column;

distilling said TiI$_4$ in said first distillation column to remove lower volatility impurities, said first distillation column operated at a temperature in the range of about 150°–370° C. and at a pressure in the range of about 0.05–670 torr to produce partially pure $TiI_4$;

transferring the partially pure $TiI_4$ to a second distillation column;

distilling said partially pure $TiI_4$ in said second distillation column to remove higher volatility impurities, said second distillation column operated at a temperature in the range of about 150°–370° C. and at a pressure in the range of about 0.05–670 torr to produce ultra high purity of greater than 99.998% $TiI_4$;

transferring the ultra high purity $TiI_4$ in liquid form to a deposition chamber heated to a temperature of about 200° C. to vaporize the liquid $TiI_4$; and contacting a titanium deposition substrate located within the deposition chamber and heated to a temperature in the range of about 1100°–1400° C. with the ultra high purity $TiI_4$ vapor, whereby said $TiI_4$ decomposes and ultra high purity of greater than 99.998% titanium metal is deposited on said substrate.

2. The method according to claim 1 wherein said generating step is performed under vacuum conditions at a pressure in the range of about 0.05–670 torr.

3. The method according to claim 2 wherein said generating step is performed at a pressure in the range of about 0.05–670 torr.

4. The method according to claim 1 wherein said first distillation column is operated at a pressure in the range of about 2.5–4 torr.

5. The method according to claim 1 wherein said second distillation column is operated at a pressure in the range of about 2.5–4 torr.

6. The method according to claim 1 wherein said titanium metal starting material has a purity on the order of about 99.9%.

7. The method according to claim 6 wherein said titanium metal starting material is in the form of a sponge.

8. The method according to claim 1 wherein said titanium substrate is a high purity titanium filament.

9. The method according to claim 1 wherein said titanium substrate is a high purity titanium rod.

10. The method according to claim 1 wherein said titanium substrate is a high purity titanium tube.

11. The method according to claim 1, further comprising: subjecting the ultra high purity deposited titanium metal to electron beam melting to further purify the titanium metal.

* * * * *

UNITED STATES PATENT AND TRADEMARK OFFICE
CERTIFICATE OF CORRECTION

PATENT NO.   : 5,700,519
DATED        : December 23, 1997
INVENTOR(S)  : Raymond K. F. Lam It is certified that error appears in the above-indentified patent and that said Letters Patent is hereby corrected as shown below:

At column 3, line 42, "an" should be --art--.

At column 5, line 56, please insert " " " after --3¼--.

Signed and Sealed this

Seventh Day of April, 1998

Attest:

BRUCE LEHMAN

*Attesting Officer*     *Commissioner of Patents and Trademarks*